Oct. 22, 1963   J. H. ELLIS   3,107,892
COMPRESSOR AIR BLEED VALVE
Filed Dec. 1, 1960

INVENTOR.
John H. Ellis
BY
Robert E. McCallum
ATTORNEY

United States Patent Office 3,107,892
Patented Oct. 22, 1963

3,107,892
COMPRESSOR AIR BLEED VALVE
John H. Ellis, Indianapolis, Ind., assignor to General Motors Corporation, Detroit, Mich., a corporation of Delaware
Filed Dec. 1, 1960, Ser. No. 72,895
3 Claims. (Cl. 251—62)

This invention relates to a valve structure. More particularly, it relates to the specific construction of valving for controlling the bleed of air from a gas turbine engine compressor.

Aircraft type compressors as well as others may have a number of compressor air bleed valves to vent stage air overboard to unload the compressor and prevent surge during engine starting conditions and during acceleration from low speed taxi to high speed taxi operation. During subsequent operations, such as cruise, the valves may be maintained closed by either later stage air, for example, or other means to prevent a loss in efficiency. In past known installations, fluid seals have been used to prevent leakage. Since, however, the seals may be subjected to compressor air at temperatures varying between 200° to 300° F., and pressures ranging between 90 to 120 p.s.i, the seals tend to fatigue early, thereby permitting leakage through the valves. This invention eliminates the seals and their attendant wear problems by providing a valve structure utilizing poppet type sealing surfaces and means to hold the valve closed by stream pressure.

Therefore, it is an object of this invention to provide a compressor air bleed valve construction that when desired permits bleed of compressor air outboard of the compressor, and when not desired, prevents leakage and accompanying contamination through the closed valves. It is a further object of the invention to control the flow of fluid through a passage by a valve constructed for both linear and rotary motion between open and closed positions.

Figure 1:
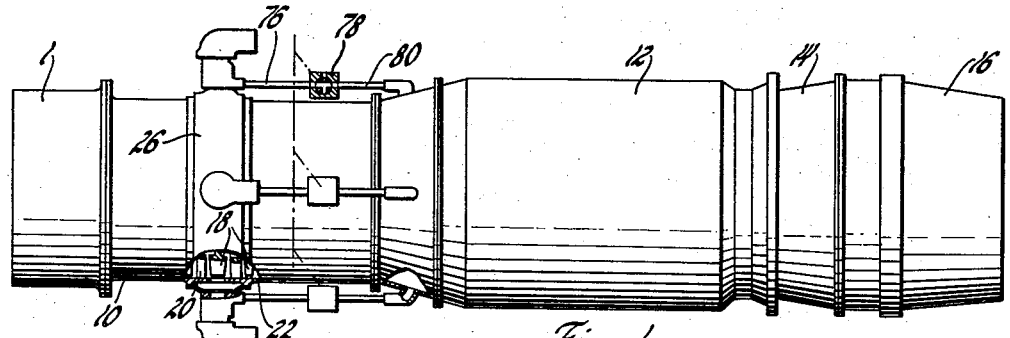
Figure 2:
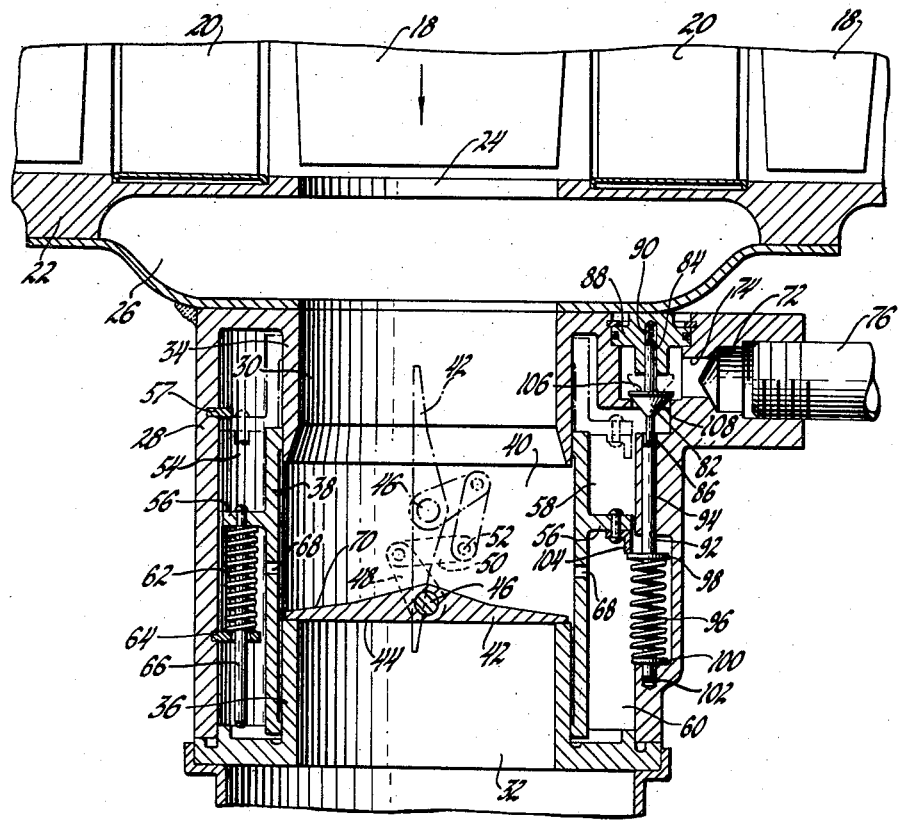

Other objects, features and advantages of the invention will become apparent upon reference to the succeeding detailed description of the invention and to the drawings illustrating the preferred embodiment thereof, wherein;

FIGURE 1 is a schematic side elevational view of an engine embodying the invention; and FIGURE 2 is an enlarged view of a detail of FIG. 1 with parts broken away and in section.

Briefly, this invention relates to a valve construction providing a passage through a compressor case to bleed air therethrough, and a butterfly type valve movable to open or close the passage. The valve is operated by a piston reciprocated in the valve opening direction by spring force alone or in combination with bleed air pressure, and in the valve closing direction by higher pressure compressor air. The higher pressure air is controlled by a poppet type valve, itself controlled by movement of the piston.

Referring to the details, FIG. 1 schematically illustrates a gas turbine engine embodying the invention. The engine comprises an air inlet 1, a compressor section 10, a combustion section 12, a turbine section 14, and a fixed exhaust nozzle 16. The compressor in section 10 is of the axial flow type having a number of stages, only two of which are illustrated. Each stage comprises in general an annular row of rotor blades 18 secured to a rotor (not shown), and cooperating with an annular row of stator vanes 20 secured to the compressor case 22 as shown. Further details of the engine per se will not be given since they are known and are believed to be unnecessary for an understanding of the invention.

Compressor case 22 is apertured over a rotor blade stage at four locations 24 spaced 90° apart for bleeding air from that particular stage into an annular manifold 26, surrounding the compressor. Manifold 26 in turn, is apertured at an equal number of points for cooperation with the apertured inlet end of a compressor air bleed valve housing 28. The number of stages to be bled, and the number of bleeds will of course vary with the particular installation as a matter of choice. Since the particular details of construction and operation of all of the valve mechanisms are substantially the same, only one will be described.

Valve housing 28 has an air inlet 30 and an outlet 32 both formed as open end tubular sections 34 and 36 aligned with each other. The gap between the sections is bridged by a close fitting sleeve 38 slidably and telescopically mounted over the section ends to form a fluid passage 40 between the inlet and outlet. The radial clearance between sleeve 38 and sections 34 and 36 is such as to permit sliding between the parts but prevent any substantial passage of air.

Passage 40 is adapted to be closed by a rotatable butterfly type valve 42. The valve has a flat face 44 which, in the closed position of the valve, rests against the end of tubular section 36. The shaft 46 of the valve is rigid therewith and has its ends pivotally mounted in bushed bores in the sleeve so that the valve moves upon movement of the sleeve. A control link 48 has one end rigidly secured to the shaft 46 and its other end pivotally connected to a second control link 50. Link 50 is pivotally mounted by pins 52 on the stationary valve housing 28 outside of sleeve 38 between the housing and the sleeve. With this construction, movement of the sleeve 38 from the position shown in full lines in FIG. 2 to that shown in dotted lines causes the shaft 46 and valve 42 to be rotated 90° by the linkage from its full line position to the dotted line position fully opening passage 40. Reciprocation of the sleeve therefore controls the opening and closing movement of the valve.

The two tubular sections 34 and 36 together with sleeve 38 and the valve housing define an annulus or pressure chamber 54 into which fluid is fed for moving the sleeve 40 in a manner to be described. Extending radially from the sleeve 38 is an annular flange 56 extending into sliding abutting contact with the valve housing. The flange constitutes a piston and divides chamber 54 into two parts 58 and 60 each adapted to be filled with fluid. A number (only one shown) of compression springs 62 are mounted around the sleeve 38 between the piston flange and a stationary support 64 secured in the valve housing to bias the piston and sleeve at all times in a direction to effect opening of valve 42. Each of the springs surrounds a guide stem 66 riveted at one end to the piston and extending slidably through an aperture in support 64 at the other end.

The sleeve 38 is bored at a number of diametrically opposite points 68 to permit interchange of fluid or air between passage 40 and chamber 60 in a manner to be described later. At this point, it may be stated that with the engine running and valve 42 closed, the compressor stage air in passage 40 does two things; first, it acts directly on the back 70 of valve 42 to maintain it closed; secondly, the stage pressure is reflected in chamber 60 through holes 68 to act on the one side of piston 56 tending to move it in a valve opening direction. If the valve 42 is open, then the pressure in passage 40 is substantially ambient, and chamber 60 is vented through the holes 68.

The force of the springs 62, the area of valve 42, and the area of piston flange 56 are all so chosen in this particular installation, for example, that with valve 42 closed, compressor stage air in passage 40 and chamber 60, and ambient pressure in chamber 58, the piston will move to rotate and open valve 42. Of course, with only ambient pressure in chambers 58 and 60 and passage 40, with or without valve 42 being open, springs 62 will act on piston 56 to open or maintain valve 42 open.

The control of valve 42, therefore, is dependent upon the pressure in chamber 58 acting against the opposite side or face of the piston. Chamber 58, in this instance, is adapted to either be pressurized with air at compressor discharge pressure to act against piston 56, or to be vented to engine nacelle pressure, which is ambient. To this end, the valve housing is bored at one side to provide an air opening 72 connected by suitable passages 74 to chamber 58. Opening 72 serves both as an air inlet and vent line, and as shown in FIG. 1, is connected through a line 76 to a valve 78. Valve 78 in one position is adapted to connect line 76 to be vented to engine nacelle pressure (ambient), while in the other position, connects line 76 to supply line 80 leading from the final compressor stage. While the details are not shown since they are unnecessary for an understanding of the invention, valve 78, in this instance, is adapted to be controlled by an engine speed responsive device (not shown) to vent line 76 to ambient pressure at speeds below, say, 13,000 r.p.m., and to connect lines 76 and 80 above 13,000 r.p.m. Of course, other control devices could be used without departing from the scope of the invention.

To control the pressurizing of chamber 58 to control the movement of the actuating sleeve as well as prevent leakage, a reciprocating control valve 82 of the poppet type is placed in passage 74. Valve 82 has two valve stems 84 and 86, stem 84 being slidably received in a combination guide, cap and seal member 88. A spring 90 is positioned between the end of the bore and the stem to bias the valve to its closed or seated position. Stem 86 of the valve slidably projects into one end of a bore 92 in the valve housing and is adapted to be abutted by one end of an actuator 94 also slidably received in the bore 92. Actuator 94 is biased against stem 86 to normally force the valve off its seat by a compression spring 96 between a base flange 98 fixed on the end of the actuator and a button type base flange 100 received in a bushed bore 102 in the housing. The base flange 98 projects out from the housing into the path of a finger type actuator 104 riveted to the piston flange 56. The relative strengths of springs 90 and 96 are such that, disregarding other influencing forces, the force of spring 96 more than overbalances the force of spring 90 to keep the valve open as will be described.

Briefly, therefore, with this construction, compressor discharge air introduced into chamber 58 moves piston 56 and sleeve 38 in a direction to close valve 42. During the final closing movement of sleeve 38, finger actuator 104 moves base flange 98 to compress spring 96 and move actuator stem 94 away from valve stem 86. This permits spring 90 to seat control valve 82 and close chamber 58. The seating of the valve results in a pressure differential between the two sides of the valve due to its shape such that as long as compressor discharge air acts on the inlet side 106 of the closed valve, it is maintained tightly closed. However, as soon as the speed sensitive valve 78 is actuated to vent line 72 to nacelle pressure, the then higher pressure in chamber 58 acting against the conical outlet side 108 of the control valve is sufficient to crack open the valve against the force of spring 90 and vent the chamber 58 to nacelle pressure permitting the sleeve 38 to move to open bleed valve 42 in a manner previously described. The moment sleeve 38 moves to crack bleed valve 42 open, finger actuator 104 moves away from plate 98 permitting spring 96 to fully open control valve 82. While compressor discharge air has been used as one actuating force, it will be clear that air from other stages of the compressor could also be used without departing from the scope of the invention as long as the pressure of the particular stage air chosen is enough higher than the pressure of the air from the stage being bled to accomplish the desired functions described.

While the invention is believed to be clear in view of the previous description, operation of the bleed valve system will be described for clarity. Assuming the aircraft is at a standstill, and the engine is shut down, the air in control valve line 72 and chamber 58, as well as in inlet 30 and outlet 32, will be at ambient nacelle pressure, valve 82 will be in an open position by the force of spring 96, and sleeve 38 will be in its dotted line position with flange 56 against a stop 57 by virtue of the force of springs 62. Thus, bleed valve 42 is in a wide open position shown in dotted lines in FIG. 2. Since it is desired to maintain valve 42 open to bleed air from the compressor during starting, valve 78 is positioned by the speed sensitive device (not shown) to maintain line 72 and chamber 58 vented to nacelle pressure. The valve elements will therefore remain in the dotted line position until the engine is started and reaches a speed of, say, 13,000 r.p.m., for example.

As soon as the engine reaches this 13,000 r.p.m. speed, valve 78 is automatically moved to feed compressor discharge air into line 72 past valve 82 and into chamber 58 to act against piston flange 56. Immediately, sleeve 38 moves downwardly as seen in FIG. 2 toward the full line position to rotate valve 42 towards its closed position. At this time, the only opposition to the movement of the sleeve is that of the force of the springs 62 since chamber 60 is bled to nacelle pressure through holes 68 and outlet 32. During the final closing movements of sleeve 38 and valve 42, finger actuator 104 compresses spring 96 and permits control valve 74 to be seated by spring 90 to close chamber 58. The valve is then positively maintained seated by the compressor discharge air acting against the inlet side 106 of the valve. Thus, leakage of air into or out of chamber 58 is prevented.

At this same time, valve 42 is seated against the end of tubular section 36 defining the outlet opening, and the pressure of the air from the stage being bled acts against the total area of the back portion 70 of the valve to maintain it closed. Simultaneously, the leak of compressor stage air into chamber 60 through holes 68 causes a buildup in pressure in chamber 60 acting against the one side of piston flange 56 in opposition to the pressure in chamber 58.

With the passage of time, the pressure of the air in chamber 58 gradually decays to that of the air in chamber 60 due to leakage through the clearances between the edges of the piston flange and the sleeve and between the sleeve and tubular sections 34 and 36. Thus, the pressures in both chambers 58 and 60 become substantially the same and equal the air pressure at the stage being bled, as long as compressor discharge air is acting on control valve 82. Bleed valve 42 is therefore maintained in a closed position in opposition to the force of springs 62 by the compressor stage air acting directly against it. During engine shut-down, or at other times when it is again desired to bleed air, the drop in engine speed below 13,000 r.p.m. causes actuation of valve 78 to vent line 72 to nacelle pressure immediately causing control valve 82 to be cracked open by the pressure of the air in chamber 58, which then begins decaying to nacelle pressure. This drop in pressure causes the movement of the piston flange initially by the higher pressured air in chamber 60 in a bleed valve opening direction releasing spring 96 to fully open control valve 82 and completely vent chamber 58. The force of springs 62 and the air pressure in chamber 60 then moves the sleeve 38 to completely open bleed valve 42. It will be noted that the size of opening 68 and therefore the rate of venting of chamber 60 once bleed valve 82 has cracked open can be a matter of choice since the forces of springs 62 alone are sufficient to move the sleeve to open the valve while chamber 58 is at ambient pressure.

From the foregoing, therefore, it will be seen that this invention provides a highly reliable compressor air bleed valve mechanism eliminating the use of seal type rings with their attendant wear and leakage. It will also be seen that the invention provides a compressor bleed valve actuated to a closed position by higher pressured later stage air and maintained closed by the stream pressure against it, this construction preventing the leak of actuating air into the compressor area after the bleed valve is closed. This construction furthermore permits the operation of this bleed valve system throughout a large range of temperatures and pressures.

While the invention has been illustrated in its preferred embodiment in the figures in connection with a gas turbine engine of the axial flow type, it will be clear to those skilled in the arts to which this invention pertains that many modifications may be made thereto and the invention may be used in other installations than that described without departing from the scope of the invention.

I claim:

1. Valve means comprising a valve housing having a fluid inlet exposed to fluid at one pressure and an outlet exposed to fluid at a lower pressure, a passage connecting said inlet and outlet, a first valve in said passage movable to open or closed passage positions, said valve in its closed position being acted upon by the fluid in said inlet to maintain it closed, and means for effecting movement of said valve, said means including a closed fluid chamber in said housing, a piston reciprocably mounted in said chamber, and means connecting said piston and valve for movement together to open or close said valve, means communicating the inlet fluid to one side of said piston tending to move said piston to open said valve, spring means biasing said piston to open said valve, conduit means at times communicating fluid at a pressure higher than said inlet pressure to the opposite side of said piston to move said piston to close said valve and at other times containing fluid at said lower pressure, and second control valve means in said conduit means movable between positions to open or close said conduit means to control the flow of said higher pressure fluid into and out of said chamber to control the movement of said piston and first valve, said second control valve being movable to a closed position in response to the movement of said piston in a first valve closing direction, the presence of fluid at said lower pressure in the conduit means acting on the side of the second control valve opposite to that adjacent the chamber effecting the opening of said second control valve by said higher pressure fluid in said chamber to vent said higher pressure fluid acting on said piston thereby permitting the spring means and fluid inlet pressure acting on the opposite side of said piston to open said first valve in opposition to the fluid inlet pressure acting thereon.

2. Valve means comprising a valve housing having a fluid inlet at one pressure and a fluid outlet at a lower pressure, passage means connecting said inlet and outlet, valve means in said passage movable to open or closed passage positions, and fluid pressure actuated means connected to said valve means for movement together, means at times connecting fluid at a pressure higher than that in said inlet to said actuated means to move it to close said valve means, said valve means in its closed position being acted upon by the fluid in said inlet to maintain it closed, and means connecting the fluid in said inlet to said actuated means for actuating said actuated means in the absence of said higher pressure fluid to open said valve means to bleed fluid from said inlet.

3. A valve assembly comprising a valve housing and having a fluid inlet adapted to receive fluid therein at one pressure and an outlet to bleed said fluid outboard of said housing, passage means connecting said inlet and outlet, valve means in said passage movable to open or closed passage positions, and fluid pressure actuated means connected to said valve means for movement together, means at times connecting fluid at a higher pressure than the fluid in said inlet to said actuated means to move it to close said valve means, said valve means in its closed position being acted upon by the fluid in said inlet to maintain it closed, and means actuating said actuated means in the absence of said higher pressure fluid acting thereon to open said valve means to bleed fluid from said inlet including means connecting said inlet fluid to act on said actuated means, and spring means biasing said actuated means to open said valve means.

References Cited in the file of this patent

UNITED STATES PATENTS

| | | |
|---|---|---|
| 654,009 | Kittinger et al. | July 17, 1900 |
| 1,759,060 | Moore | May 20, 1930 |
| 2,655,942 | Dougherty | Oct. 20, 1953 |
| 2,708,563 | Backman et al. | May 17, 1955 |
| 2,874,926 | Gaubatz | Feb. 24, 1959 |
| 2,886,968 | Johnson et al. | May 19, 1959 |
| 2,910,266 | Condello et al. | Oct. 27, 1959 |
| 2,940,258 | Lombard et al. | June 14, 1960 |